United States Patent [19]

Taguchi et al.

[11] Patent Number: 4,673,248

[45] Date of Patent: Jun. 16, 1987

[54] REFLECTING MIRROR FOR AN AUTOMOBILE

[75] Inventors: Takasi Taguchi, Anjo; Yoshiki Ueno; Tadashi Hattori, both of Okazaki, all of Japan

[73] Assignee: Nippon Soken, Inc., Nishio, Japan

[21] Appl. No.: 902,028

[22] Filed: Aug. 25, 1986

Related U.S. Application Data

[63] Continuation of Ser. No. 598,432, Apr. 9, 1984, abandoned.

[30] Foreign Application Priority Data

Apr. 11, 1983 [JP] Japan .................. 58-63415
Jul. 7, 1983 [JP] Japan .................. 58-123844

[51] Int. Cl.$^4$ ............................. G02B 5/08; G02B 5/28
[52] U.S. Cl. ..................................... 350/166; 350/278
[58] Field of Search ................ 350/164, 166, 482, 278

[56] References Cited

U.S. PATENT DOCUMENTS

| Re. 25,767 | 4/1965 | Auffenorde et al. | |
|---|---|---|---|
| 2,590,906 | 4/1952 | Tripp | 350/166 |
| 2,617,741 | 11/1952 | Lytle | |
| 2,624,823 | 1/1953 | Lytle | |
| 2,698,261 | 12/1954 | Gaiser | |
| 2,772,190 | 11/1956 | Haayman et al. | |
| 3,053,698 | 9/1962 | Ogle, Jr. et al. | |
| 3,356,522 | 12/1967 | Libbert | |
| 3,356,523 | 12/1967 | Libbert | |
| 3,649,359 | 3/1972 | Apfel et al. | 350/166 |
| 3,846,152 | 11/1974 | Franz | 350/166 |
| 3,853,386 | 12/1974 | Ritter et al. | |
| 4,070,781 | 1/1978 | Sauer | |
| 4,128,303 | 12/1978 | Onoki et al. | |
| 4,244,997 | 1/1981 | Postupack | |
| 4,482,209 | 11/1984 | Grewal et al. | 350/642 |

OTHER PUBLICATIONS

W. H. A. Fincham et al, "Optics", Butterworths, Eighth edition, The Pittman Press, Bath, U.K., 1974.
Zdenek, Knittl; "Optics of Thin Films", 1976, pp. 104–105 and 152–153.

*Primary Examiner*—Bruce Y. Arnold
*Attorney, Agent, or Firm*—Cushman, Darby & Cushman

[57] ABSTRACT

A reflecting mirror for use as a rearview mirror in an automobile, the mirror having a plurality of thin layers arranged on a glass plate. One of the layers is made of a transparent dielectric material having a refractive index which is not less than a refractive index of $WO_2$ and the other is made of a metal material having a reflecting factor ranging between 50–70%. The light introduced into the mirror is reflected at different borders formed in the mirror between the layers so as to provide lights of different phases. Therefore, there is an interference, and, consequently, the mirror provides a certain selected tone in accordance with the value of the optical thickness of the transparent dielectric layer, resulting in an anti-glare effect and a deep color.

7 Claims, 12 Drawing Figures

REFLECTING MIRROR FOR AN AUTOMOBILE

This is a continuation of application Ser. No. 598,432, filed Apr. 9, 1984, which was abandoned upon the filing hereof.

BACKGROUND OF THE INVENTION

1 Field of the Invention

The present invention relates to a reflecting mirror for an automobile, which reflecting mirror may be advantageously used as a rearview mirror positioned inside the automobile or on a fender.

The term "tone", used throughout the specification, means the perceptive evaluation of a color determined by both the lightness of and the saturation of the color.

2 Description of the Prior Art

The known reflecting mirror for an automobile comprising a substratum plate made of a glass material on which an aluminum material is deposited under vacuum vaporization. In this case, the mirror has a reflection factor as high as from 80% to 90% and has a relatively flat spectral characteristic. In other words, the reflection factor is high in a range of wavelengths corresponding to visible rays. As a result, the driver of the automobile is blinded when the sun shines behind him or by the lights of a vehicle behind him. In order to eliminate such an annoyance, a mirror is proposed wherein the luminous reflection factor is decreased by 50% or so, this being attainable by using a principle of light interference so as to provide a blue mirror. The mirror has between 3 and 5 thin layers and a painted black layer, this number of layers increasing the cost thereof. Wherein it is desired to produce a mirror of another color tone (for example, bronze), the luminous reflection factor is extremely decreased to a level which does not satisfy the requirement set forth in the automobile standards.

SUMMARY OF THE INVENTION

An object of the present invention is to provide a mirror for use in an automobile, the mirror being capable of overcoming the above-mentioned drawbacks encountered in the prior art.

Another object of the present invention is to provide a mirror for an automobile, the mirror being capable of being any selected deep color tone without the production cost being increased and the reflection factor being decreased.

Yet another object of the present invention is to provide a mirror for an automobile, the mirror preventing sunlight or other automobile lights from blinding the driver while having a suitable reflection factor for an automobile mirror.

According to the present invention, a reflecting mirror for an automobile is provided, the reflecting mirror comprising a substratum glass plate, a metallic thin layer which is arranged on the glass plate and which reflects 50–70% of light striking it, and a thin layer, disposed on the metallic layer and made of a transparent dielectric material, the optical thickness of the transparent dielectric layer being such that the desired color of reflected light, especially bronze, is attained.

DESCRIPTION OF THE PREFERRED EMBODIMENTS

The preferred embodiments of the present invention are now described with reference to the attached drawings.

Figure 1:
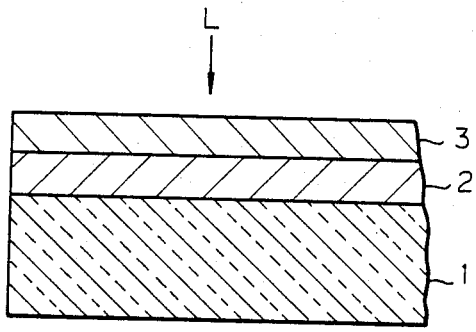
FIG. 1 shows the construction of a reflecting mirror according to the first embodiment of the present invention.

In FIG. 1, reference numeral 1 designates a substratum plate made of glass on which a thin metal layer or film 2 (of a selected thickness) of an alloy of nickel and chrome is, by vacuum deposition, formed so as to act as a surface on which a light is reflected. Furthermore, a thin layer or film 3 of a transparent dielectric material made of titanium oxide ($TiO_2$) is formed on the surface of the metal film 2. Formation of the metal layer 2 and/or the transparent dielectric layer 3 is not limited to vacuum deposition and, therefore, the layers 2 and 3 can be formed by another method, such as sputtering.

The light is introduced as shown by the arrow L in FIG. 1, passes through the transparent dielectric layer 3, and is reflected at the surface of the metal layer 2. The reflected light then passes through the transparent dielectric layer 2 again and exits in a direction opposite to the direction in which the light is introduced. Part of the light at the surface of the transparent layer 3 does not pass through the layer 3 and is reflected. The amount of light reflected at the surface of the transparent layer 3 is determined in accordance with the refractive index of the material from which the layer 3 is made. Since the light has difference phase, there is an interference between the light reflected at the surface of the metal layer 2 and the light reflected at the surface of the transparent dielectric layer 3, which intereference prevents the spectral characteristic of the reflected light from being flat to enhance a selected spectral color, thereby resulting in color and anti-glue effects. In this case, the tone and the reflection factor are determined by the optical thickness of the transparent dielectric layer 3, which thickness is determined by the product of the thickness of the layer 3 and the refractive index or by the thickness of the layer 3 only when the refractive index is constant, while the degree of saturation of color, that is, whether the color is deep or not, is determined by the refractive index. These facts are fully described hereinafter.

Figure 2:
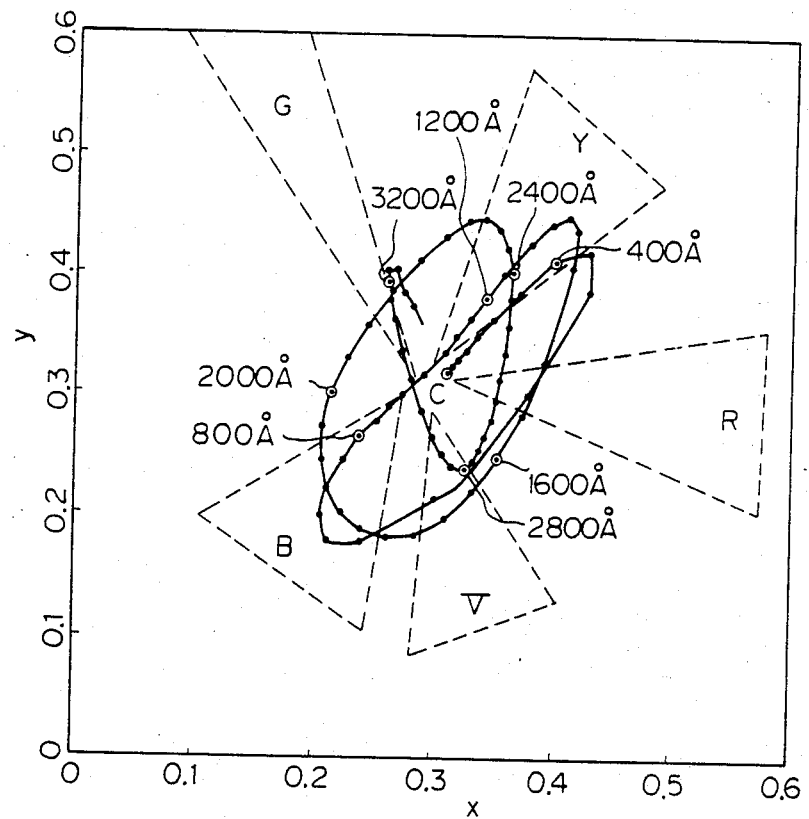
FIG. 2 shows the relationship between the thickness of the transparent dielectric layer and the tone.

FIG. 2 shows a chromaticity diagram which explains the amount of respective components (x, y and z) of red, green and blue, which is established by the International Commission on Illumination (ICI or ICE). In this well known and well established system for describing color x represents the proportion of red in a color, y represents the proportion of green in a color, and z represents the proportion of blue in a color. Obviously, the sum of x, y and z must equal 1.0, the entire color being analyzed. the relationship between the film thickness of the transparent layer 3 and the tone of reflected light in the chromaticity coordinate system when standard white light C, which is determined by Japanese Industrial Standard (JIS)Z8701, is introduced vertically into the mirror in the first embodiment. A thin layer made by vacuum deposition has a refractive index value which is usually smaller than the refractive index value of the bulk. Titanium oxide has, for example, a refractive index value of 2.46 when the wavelength of the light is 4,500 A and a refractive index value of 2.30 when the wavelength of the light is 6,500 A, these values being more or less smaller than the refractive index value of the bulk. In the chromaticity coordinates shown in FIG. 2, any color is given by the combination of x, y and z while the equation $x+y+z=1.0$ is attained, as established by ICI as previously mentioned. Then the abscissa x designates the percentage of red component, the ordinate y designates the percentage of green component, and $1-(x+y)$ designates the percentage of blue component. Roughly speaking, in FIG. 2, the areas G, Y, R, V, and B enclosed by the broken lines correspond to areas which provide green, yellow, red, violet, and blue tones, respectively. In the areas located between the above-mentioned areas G, Y, R, V, and B, secondary mixed colors can be obtained. With regard to the relationship between the thickness of the layer 3 and the tone of reflected light, the chromaticity, that is hue is indicated by points marked by " " for every increase in thickness of 400 Å and by points marked by "." for every increase in thickness of 40 Å. FIG. 2 clearly shows that a desired tone of reflected light can be obtained by selecting an appropriate thickness of the dielectric layer 3.

Those of ordinary skill in the art will realize that dielectric layer 3 must have negligible roughness for a desired tone to be produced. FIG. 2 illustrates that a change in thickness of only 80 Angstrom from 520 Angstrom to 600 Angstrom would change the color of the mirror from red through violet to blue. In this application including the claims, the term "negligible roughness" will refer to a surface sufficiently smooth to maintain the thickness of layer 3 sufficiently uniform to produce a desired tone.

Figure 3:
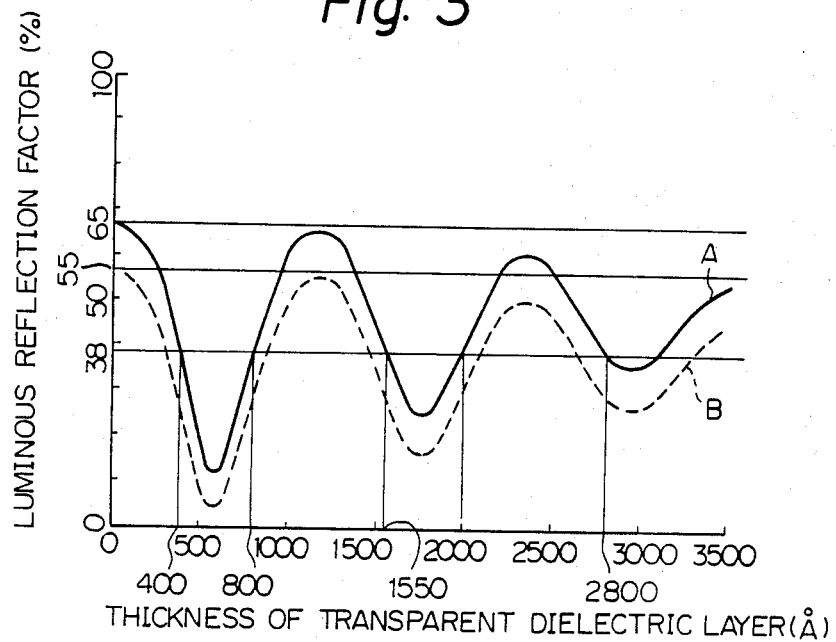
FIG. 3 shows the relationship between the thickness of the transparent dielectric layer and the luminous reflection factor.

FIG. 3 shows the relationships between the thickness of the transparent dielectric layer 3 and the perceptible lightness which corresponds to the luminous reflection factor. In this figure, the relationship A corresponds to a case where the metal material layer 2 is made of an alloy of nickel and chrome, whereas the relationship B corresponds to a case where the metal material layer 2 is made of titanium. The reason why the luminous reflection factor makes a wave as shown in FIG. 3 is that human eyes have a maximum sensitivity to light of a wavelength of 5,550 Å, appearing as given light, and that the sensitivity is decreased when the wavelength is spaced further from the above-mentioned value. In other words, a human feels that a green light is the brightest light and that a red or blue light is less bright than a green light, even if it has the same strength, with the result that the luminous reflection factor is decreased at a film thickness corresponding to a red or blue color. Of course, those of ordinary skill in the art would realize not only the thickness of layer 3 but also the reflectivity of metal layer 2 (as illustrated in FIG. 3) and the refractive index of layer 3 also affect the overall reflecting factor of the mirror.

According to automobile regulations, it is required that the luminous reflection factor be larger than 38%. This requirement is, in the curve A of FIG. 3, satisfied when the transparent dielectric thin layer 3 has a film thickness in the ranges of 0–400 Å, 800–1,550 Å, and 2,000–2,800 Å. Film thicknesses within these ranges provide, as is clear from FIG. 2, substantially all tones. This means that any selected tone can be provided by selecting the film thickness while at the same time satisfying the automobile regulations.

In a case where the metal layer 2 is made of titanium material, which corresponds to the curve B in FIG. 3, the ranges of the thickness of the transparent dielectric layer 3 where the luminous reflection factor is higher than the automobile-regulation reflection factor value of 38% are more or less narrower than the case of curve A. However, film thicknesses within these ranges provide substantially all tones.

With regard to the luminous reflection factor, the value is lower than 65% in the case of curve A and is lower than 55% in the case of curve B, permitting attainment of a high anti-blinding effect.

These results of the present invention are compared with the previously mentioned prior art interference-type mirror having three layer of films of a thickness of one fourth of the wavelength λ.

Figure 4:
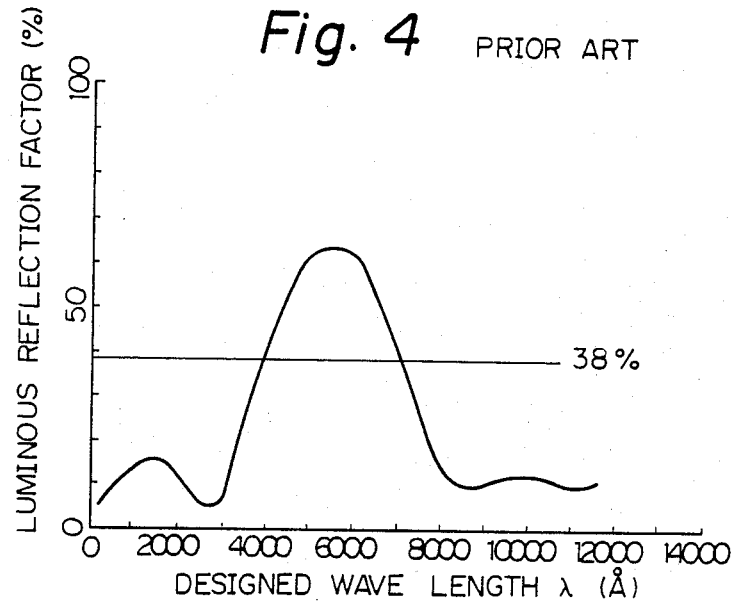
FIG. 4 shows the relationship between the wavelength and the luminous reflection factor in a prior art.
Figure 5:
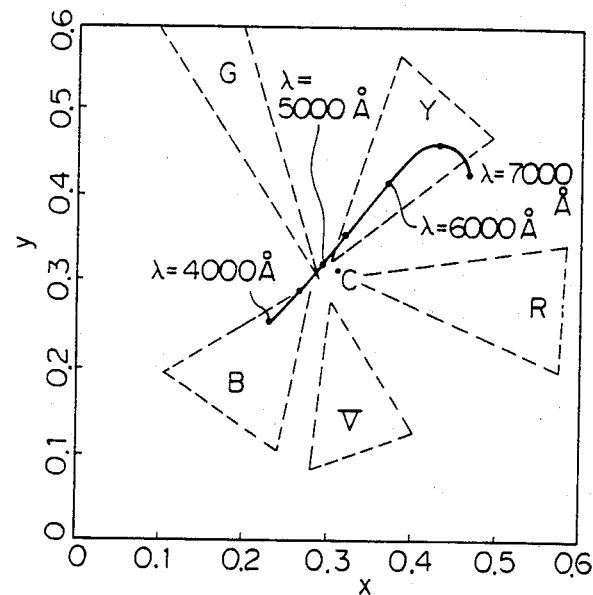
FIG. 5 shows the relationship between the wavelength and the luminous reflection factor in another prior art.

FIG. 4 shows, in the prior art three-layer mirror of a λ/4 thickness, the relationship between the designed wavelength λ and the lightness (luminous reflection factor). As is clear from FIG. 4, the wavelength λ must be in a range of from 4,000 Å to 7,000 Å in order to satisfy the automobile requirement that it be larger than 38%. The change of the tone, when the wavelength λ is in the abovementioned range (4,000 to 7,000 A), is shown in FIG. 5 by the solid line. As FIG. 5 shows, it is possible to provide yellow and blue tones, it is difficult to obtain a green tone, and it is impossible to obtain a bronze (yellow-red) tone.

Figure 6:
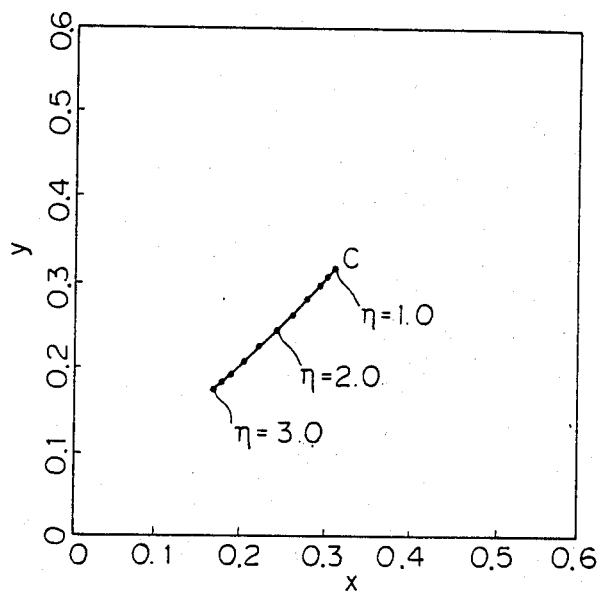
FIG. 6 shows the relationship between the refractive index and the tone.

FIG. 6 shows the relationship between the refractive index n of the transparent dielectric layer 3 of FIG. 1 and the degree of saturation. This curve is obtained by changing the refractive index n of the transparent dielectric thin layer 3 which is formed on the mtal layer 2 made of an alloy of nickel and chrome while maintaining a constant value of an optical film thickness of 1,612 Å, which is the product of the film thickness and the refractive index. Since the optical thickness is constant, a constant blue tone is obtained. And, further, in accordance with an increase in the refractive index, the distance from the position of the coordinate corresponding to the standard white light source C which is determined by JIS is increased, resulting in an increased degree of saturation. This means that the transparent dielectric thin layer 3 should be made of a material having a refractive index having a large value when it is desired to obtain a mirror of a deep color.

The materials used to make the transparent dielectric layer 3 and the values of the refractive index as bulk are listed in the following Table I.

TABLE I

| Material | Refractive Index | Material | Refractive Index |
|---|---|---|---|
| LiF | 1.33 | CeF$_3$ | 1.63 |
| MgF$_2$ | 1.38 | WO$_2$ | 1.8 |
| SiO$_2$ | 1.45 | ZrO$_2$ | 2.1 |
| SiO | 1.6 | CeO$_2$ | 2.3 |
| Al$_2$O$_3$ | 1.62 | TiO$_2$ | 2.42 |

The metal layer 2 can be made of any kind of metal material. However, a metal having a high reflection factor, such as aluminum, causes the luminous reflection factor to be increased, resulting in a decrease in the anti-blinding effect. Therefore, it is preferred to use metal materials, which provide, when formed as a layer, a reflection factor of 50%-70%. Such materials as an alloy of nickel and chrome, chrome, titanium, and an alloy of nickel and cobalt may be advantageously used.

Figure 7:
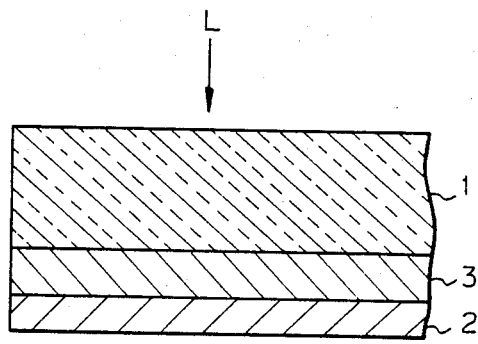
FIG. 7 shows the construction of the second embodiment.

A second embodiment of the present invention is now described. As is shown in FIG. 7, the second embodiment mirror is of a type provided with a reflecting surface at the back thereof. In the first embodiment, the metal layer 2 is formed on the substratum plate 1 and the transparent dielectric layer 3 is formed on the metal film 2; but the second embodiment is provided with a substratum glass plate 1 on which a transparent dielectric layer 3 made of titanium oxide material is formed, and a metal layer 2 made of an alloy of nickel and chrome is formed on the layer 3. The light is introduced as is shown by the arrow L in FIG. 7. This construction of the reflecting layer provided at the back of the mirror suffers from a drawback in that it is possible for it to provide a double image because of reflection at the surface of the glass plate 1. It is, however, advantageous in that the metal layer 2 and the transparent dielectric layer 3 are located beneath the glass plate 1, thereby preventing the direct access of water when it rains or the direct access of a brush when the automobile is washed, resulting in an increased durability.

Figure 8:
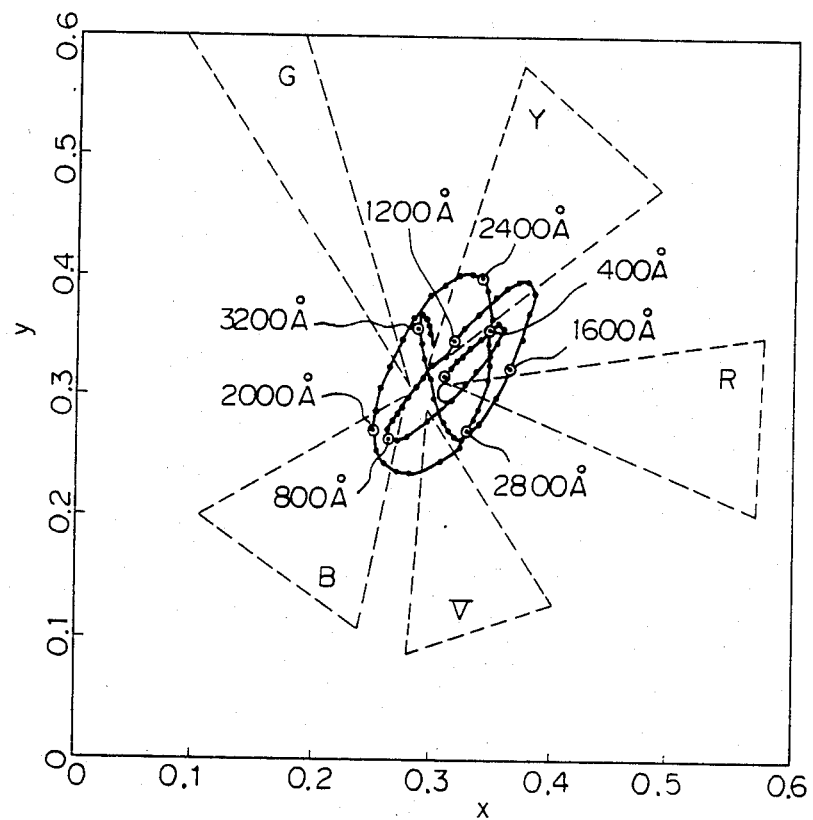
FIG. 8 shows the relationship between the thickness of the transparent dielectric layer and the tone in the second embodiment, which relationship is similar to that of FIG. 2.

FIG. 8 shows the relationship between the thickness of the transparent dielectric layer 2 and the tone is the chromaticity coordinate when, similar to the first embodiment, the standard white light C is introduced perpendicular to layer 2. As compared to the curve in FIG. 2 of the first embodiment, an inwardly disposed curve is obtained, which results in the tone being lightened or less pure. However, it is possible to obtain a desired tone by selecting an appropriate film thickness.

Figure 9:
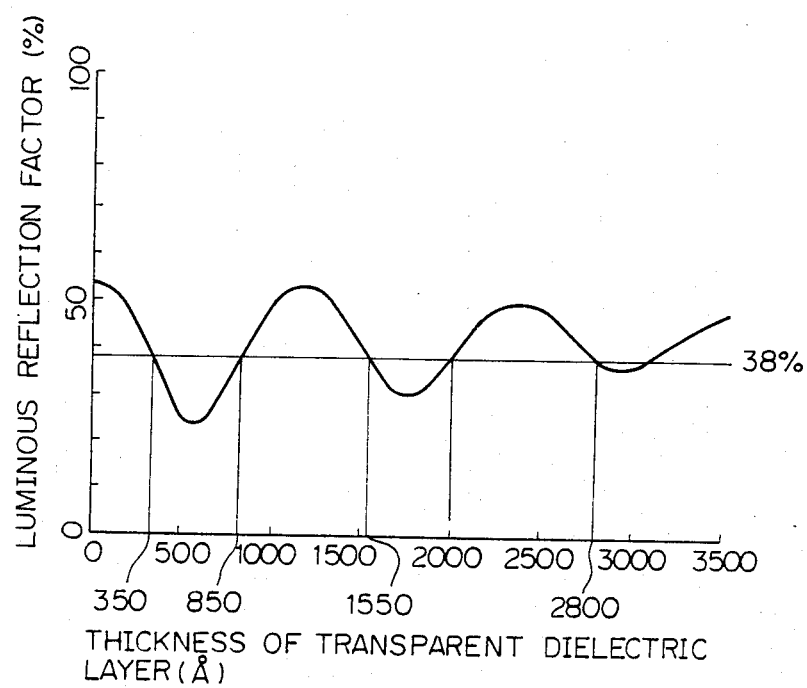
FIG. 9 shows the relationship between the thickness of the transparent dielectric layer and the luminous reflection factor in the second embodiment, which relationship is similar to that of FIG. 3.

FIG. 9 shows the relationship between the thickness of the dielectric layer 2 and the lightness (luminous reflection factor) in the second embodiment. As is clear therefrom, in order to attain a luminous-reflection-factor value larger than 38% as required by the automobile regulations, the film thickness of the transparent layer 3 should be in a range of from 0–350 Å, 850–1,550 Å, and 2,000–2,800 Å. Film thicknesses within these ranges provide substantially all tones.

In the prior art titanium oxide.silicone oxide light-interference film mirror of a type which reflects at the back thereof, a small reflection factor value is provided, which cannot satisfy the automobile requirement if the three-layer construction is maintained. It is necessary to provide a five-layer construction in order to satisfy the requirement. This embodiment makes it possible to provide a type of mirror which reflects at the back thereof irrespective of the provision of only two layers, i.e., a metal layer 2 (FIG. 10) and a transparent dielectric layer 3, and by which a decrease in cost can be achieved.

Figure 10:
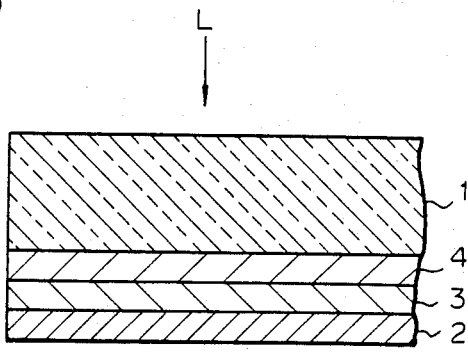
FIG. 10 shows the construction of the third embodiment.

FIG. 10 is a third embodiment, which is an improvement in the second embodiment. In addition to the glass plate 1, the metal layer 2, and the transparent dielectric layer 3, which are included in the second embodiment of FIG. 7, an auxiliary transparent dielectric layer 4 is added between the glas plate 1 and the main transparent dielectric layer 3. The auxiliary layer 4 is made of magnesium fluoride (MgF$_2$) vacuum deposited on the surface of the glass plate 1 and having a refractive index (1.38) lower than the refractive index of the glass plate 1 (1.53). The main transparent dielectric layer 3 made of titanium oxide (TiO$_2$) is vacuum deposited on the surface of the auxiliary transparent dielectric layer 4 and has a refractive index (2.3) higher than that of the glass plate.

Similar to the previously described embodiments, the formation of the first and second transparent layers is not limited to vacuum deposition. Sputtering can be used.

The light introduced as shown by the arrow L in FIG. 10 passes through the dielectric layers 4 and 3, is reflected at the surface of the metal layer 2, passes through the layers 3 and 4, and exits in a direction opposite to the direction in which the light L is introduced. The light is partly reflected at the border between the glass plate 1 and the auxiliary dielectric transparent layer 4 and at the border between the auxiliary transparent dielectric layer 4 and the main transparent dielectric layer 3. The amount of light reflected at the borders is determined by the difference of the refractive index at the respective borders. An interference takes place between the light reflected at the borders and the light reflected at the metal layer so that a spectral characteristic which is not flat is obtained, resulting in color and anti-glare effects.

Figure 11:
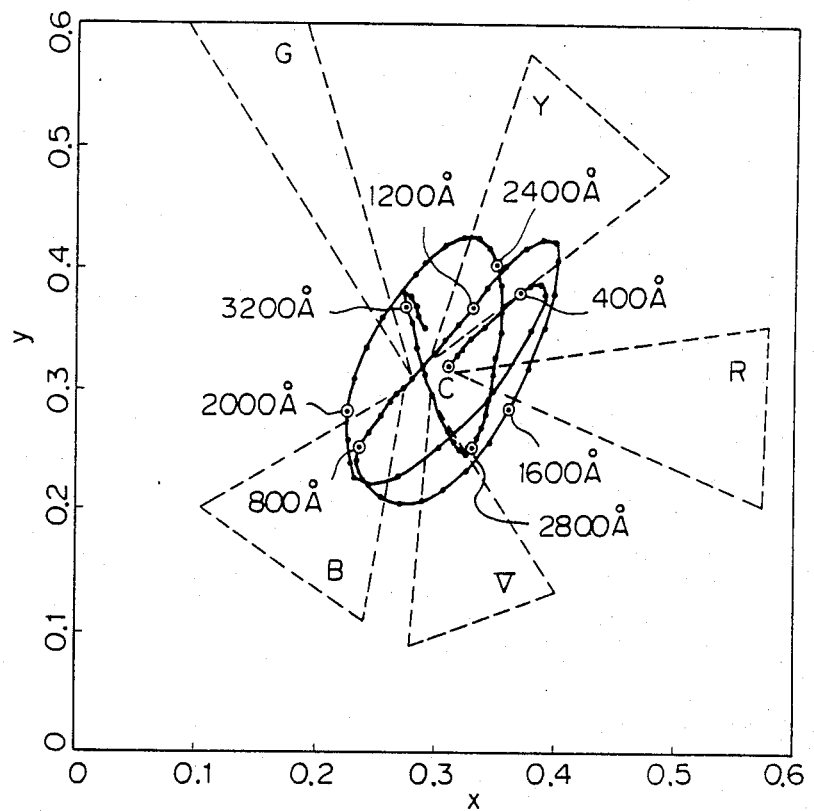
FIG. 11 shows the relationship between the thickness of the transparent dielectric layer and the tone in the third embodiment, which relationship is similar to that of FIG. 2.

FIG. 11 shows the relationship between the thickness of the main transparent dielectric layer 3 and the tone, while maintaining the thickness of the auxiliary transparent dielectric layer 4 to 1000 Å. When FIG. 11 of the third embodiment is compared with FIG. 8 of the second embodiment, it can be seen that the chromaticity curve in FIG. 11 depicts a trajectory which is more outwardly displaced from the light source color point C than does the chromaticity curve in FIG. 8. This means that the third embodiment makes it possible to obtain a tone which is purer or deeper than that which can be obtained by the second embodiment. The readon for this is that, since the difference of the refractive index between the main transparent dielectric layer 3 and the auxiliary transparent dielectric layer 4 is larger than the difference of the refractive index between the main transparent dielectric layer 3 and the substratum glass plate 1, a much larger amount of light is reflected at the border between the transparent dielectric layers 4 and 3, resulting in an increased interference effect and thereby causing the tone to be saturated.

Figure 12:
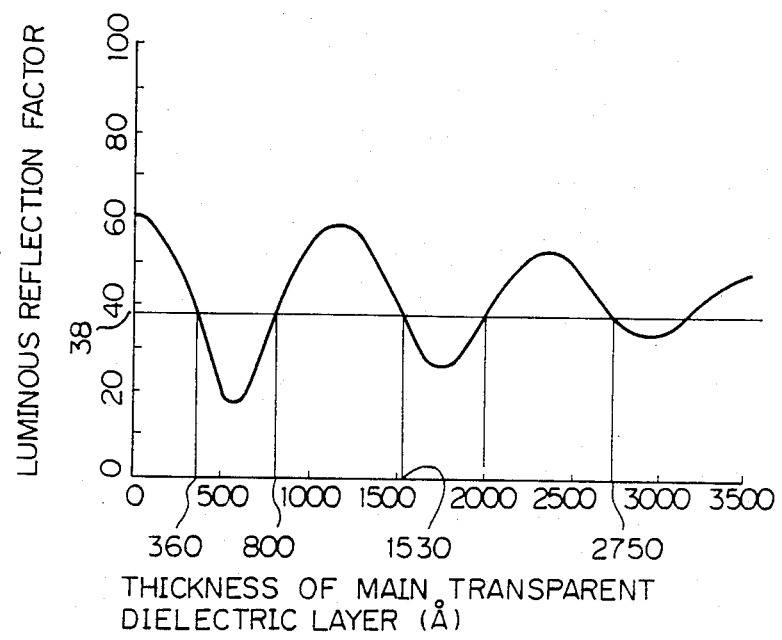
FIG. 12 shows the relationship between the thickness of the transparent dielectric layer and the luminous reflection factor in the third embodiment, which relationship is similar to that of FIG. 3.

FIG. 12 shows the relationship between the thickness of the main transparent dielectric layer 3 and the lightness corresponding to the luminous reflection factor for man in the third embodiment, which relationship is similar to that of FIGS. 3 and 9.

As is shown in Table II, there is a change of tone when the thickness of the auxiliary dielectric transparent layer 4 is changed while maintaining the thickness of the main transparent dielectric layer 3 at 800 Å.

TABLE II

| Thickness of Film (Å) | x | y |
|---|---|---|
| 0 | 0.2645 | 0.2750 |
| 500 | 0.2477 | 0.2564 |
| 1,000 | 0.2451 | 0.2655 |
| 1,500 | 0.2636 | 0.2853 |
| 2,000 | 0.2675 | 0.2708 |
| 2,500 | 0.2484 | 0.2522 |
| 3,000 | 0.2453 | 0.2736 |
| 3,500 | 0.2611 | 0.2843 |
| 4,000 | 0.2638 | 0.2625 |

As is clear from the above table, the thickness of the auxiliary dielectric layer 4 causes the degree of saturation to change. However, since the thickness of the main transparent dielectric layer 3 is maintained at 800 Å, the tone provided always remains unchanged and blue. This means that the tone obtained is determined by the optical film thickness of the main transparent dielectric layer 3 and is not influenced by the auxiliary transparent dielectric layer 4. It should be noted that a saturation color is obtained if the product of the thickness of the auxiliary transparent dielectric layer 4 and the refractive index (optical film thickness $n \times d$) is equal to $\lambda/4$ or $3 \times \lambda/4$, wherein $\lambda$ is the wavelength of the light corresponding to the selected color, which is blue in this case.

The position of the chromaticity coordinate is shown in the following Table III when, as the auxiliary transparent dielectric layer 4, lithium fluoride (LiF) or silicon oxide ($SiO_2$) is used while maintaining the thickness of the main transparent dielectric layer 3 at 800 Å.

TABLE III

| Material | Refractive Index | x | y |
|---|---|---|---|
| LiF | 1.33 | 0.2399 | 0.2638 |
| $MgF_2$ | 1.38 | 0.2451 | 0.2655 |
| $SiO_2$ | 1.45 | 0.2536 | 0.2692 |

In this case, the thickness of the main transparent dielectric layer 3 is maintained at a value corresponding to blue, similar to Table II. But it should be understood that a more saturated color may be obtained by using a material of auxiliary transparent dielectric layer having a refractive index of a lower value.

While the present invention is described with reference to the embodiments, many changes may be made by those skilled in the art without departing from the scope of the invention.

We claim:

1. A reflecting colored mirror for an automobile having anti-glare effects comprising:
   an opaque thin metal layer having a reflecting factor ranging from 50% to 70%, said metal layer defining a first light reflecting surface; and
   a thin layer made of a transparent dielectric material, said dielectric layer being formed on said surface of said thin metal layer, said dielectric layer forming a second light-reflecting surface on a surface of said dielectric layer opposite said first light-reflecting surface of said thin metal layer, the thickness of said dielectric layer being sufficiently thin to allow the surface of said dielectric layer to have negligible roughness resulting in good interference for selected frequencies of visible light, said thickness, taken into consideration with said metal layer reflecting factor and said dielectric layer refractive index, causing a required interference effect by light reflected from said first and second light-reflecting surface so that the reflecting factor of said mirror is from 38% to 65%.

2. A reflecting mirror according to claim 1, wherein said transparent dielectric material is one of $WO_2$, $ZrO_2$, $CeO_2$ and $TiO_2$.

3. A reflecting mirror according to claim 2, wherein said transparent dielectric material is $TiO_2$, and said metal layer is nickel-chrome alloy.

4. A reflecting mirror according to claim 1, further comprising a substratum layer having a surface, said thin metal layer and said dielectric layer being formed on said surface of said substratum layer by one of vacuum deposition and sputtering.

5. A reflecting mirror according to claim 1, further comprising a transparent substratum layer having a surface, and said dielectric layer being formed on said surface of said substratum layer.

6. A reflecting colored mirror for an automobile having an anti-glare characteristic comprising:
   a glass layer having a surface;
   a auxiliary dielectric layer having a reflective index lower than the reflective index of said glass layer and disposed on said surface of said glass layer;
   a auxiliary dielectric layer having a refractive index lower than the refractive index of said glass layer and disposed on said surface of said glass layer;
   a main dielectric layer having a refractive index which is greater than said glass layer and being disposed on said auxiliary dielectric layer, said main dielectric layer and said auxiliary dielectric layer defining a first light-reflecting boundary; and
   an opaque thin metal layer having a reflecting factor of from 50% to 70%, being formed on said main dielectric layer, said metal layer and said main dielectric layer defining a second light-reflecting boundary, the thickness of said main dielectric layer being sufficiently thin to allow the surface of said main dielectric layer to have negligible roughness resulting in good interference for selected frequencies of visible light, said thickness, taken into consideration with said metal layer reflecting factor and said main dielectric layer refractive index, causing a required interference effect by light reflected from said first and second light-reflecting boundaries so that the reflecting factor is from 38% to 65%.

7. A reflecting mirror according to claim 6 wherein said transparent main dielectric material is one of $WO_2$, $ZrO_2$, $CeO_2$, and $TiO_2$, and said auxiliary dielectric material is one of LiF, $MgF_2$, and $SiO_2$.

* * * * *